Dec. 13, 1960  C. E. MIDDLEBROOKS, JR  2,963,863
DRIVE CONTROL MEANS FOR A TURBO-COMPRESSOR UNIT
Filed Jan. 7, 1958                                   4 Sheets-Sheet 1

INVENTOR
C. E. MIDDLEBROOKS Jr.

BY Beale & Jones
ATTORNEYS

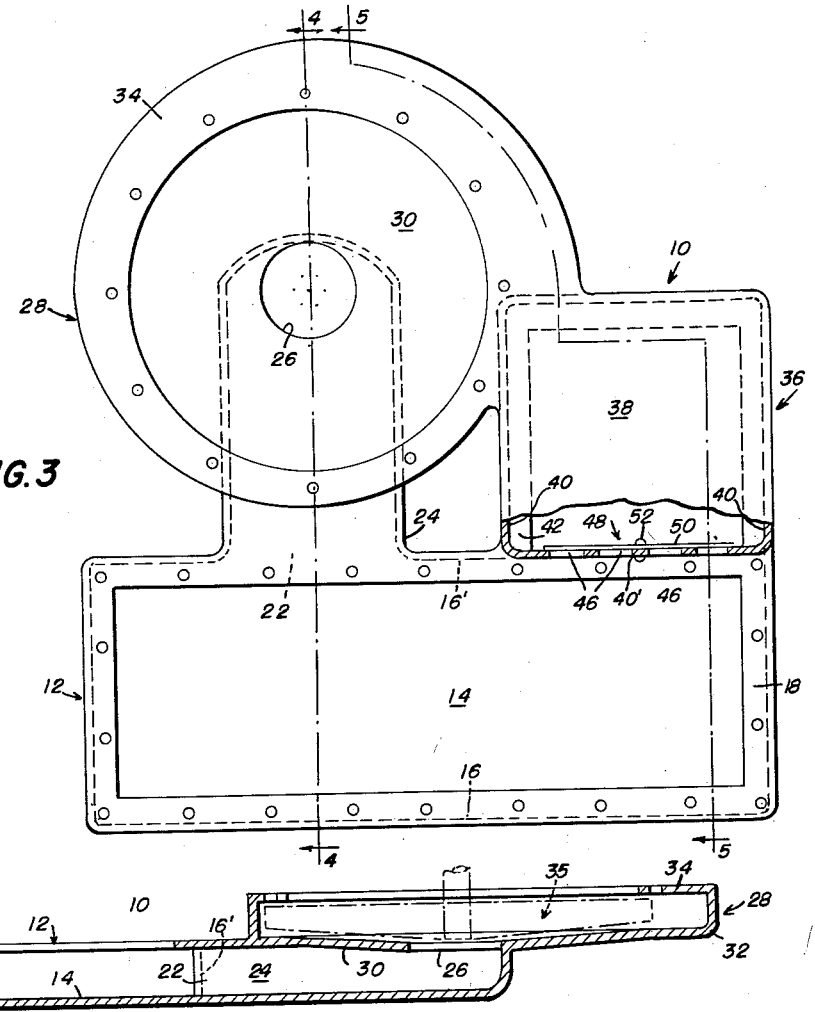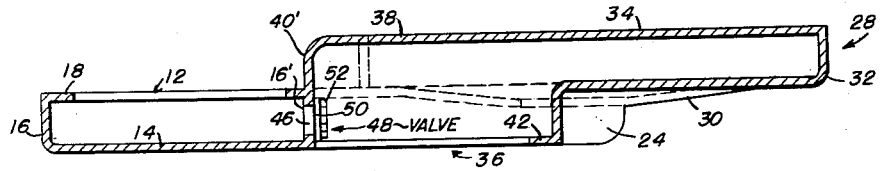

INVENTOR
C. E. MIDDLEBROOKS JR
BY Beale & Jones
ATTORNEYS

United States Patent Office 2,963,863
Patented Dec. 13, 1960

2,963,863

DRIVE CONTROL MEANS FOR A TURBO-COMPRESSOR UNIT

Clarence Eugene Middlebrooks, Jr., 4009 Ashford Road NE., Atlanta, Ga.

Filed Jan. 7, 1958, Ser. No. 707,632

2 Claims. (Cl. 60—39.75)

This invention relates to a gas-driven supercharger for an internal combustion engine. More specifically, this invention relates to a supercharger adapted to be attached between any of the conventional internal combustion engines and carburetor means therefor to increase the pressure of the gas fed into the inlet manifold of the engine. Under the present invention this is accomplished by means of an impeller operating within an impeller chamber, and driven by a turbine. The gas which drives the turbine is supplied under this invention either by the exhaust of the internal combustion engine with which the device is used or by supplemental gas-generating means.

This application constitutes a continuation-in-part of an earlier filed application, Serial No. 673,287, filed July 22, 1957, now Patent No. 2,839,038.

It has long been recognized that if the gas fed into an internal combustion engine is pressurized by a supercharger after its mixture in the carburetor with the combustion liquid, greater efficiency of the engine results. This pressurization effects an increase in the percent combustion of the gas. Great fuel savings and increased power and speed result. In pressurizing the gas by supercharger means the gas is also thoroughly mixed with the fuel liquid so that only a vapor is supplied the engine, thereby eliminating dilution of the oil in the crank case of the engine, preventing carbonization of the oil and minimizing the production of carbon monoxide gas.

The development of the modern automobile with low lines, as for instance, the modern sports car with concomitant increased interest in power and speed has created a great demand for a supercharger adapted to be installed in such a car to increase the efficiency thereof. Such a device must be compact in order to fit the low contour of the car. It is desirable that such a supercharger be installed on any one of a variety of different carburetor-engine systems by a mechanic with the use of ordinary tools and without special knowledge of any kind. It is desirable that the drive means for such a supercharger be powerful and economical to run. It is also desirable that means be provided by which the fuel mixture may freely by-pass such supercharger when the supercharger is not in operation whereby there will be no restriction of the inlet flow to the engine.

The earlier filed application mentioned hereabove, was directed to a supercharger housing of flat design adapted to be attached between any conventional internal combustion engine and the carburetor with which it is used. That application also was directed to drive means for the supercharger, said drive means being generally powered by the internal combustion engine with which the supercharger is used, or electric motor means powered by the storage battery associated with the internal combustion engine. While these means for powering the supercharger are extremely effective, additional means are contemplated by this invention for driving the supercharger.

Both of the means contemplated by the present invention are of the gas-generating type. More specifically, the means of the present invention include a turbine in operative driving relation to the supercharger, the inlet of said turbine being connected either to the exhaust manifold of the internal combustion engine with which the supercharger is used, or pulse-jet means being provided with a source of liquid fuel.

In general, the advantage of driving the supercharger by gas-generating means is that the supercharger can thus be powerfully driven at high speed and most economically. Additionally, the combination with the pulse-jet gas-forming device of this invention not only provides a steady higher pressure with which to drive the supercharger at high speed, but also provides an intriguing additional power plant which is very popular with amateur automobile mechanics interested in supercharging their conventional internal combustion engines.

An object of this invention is, therefore, to provide a supercharger unit powered by gas generating means, thereby making possible efficient and high speed pressurization of the fuel fed into the internal combustion engine.

Another object of this invention is to provide a supercharger which is adapted to fit onto any of the conventional internal combustion engines and to be powered either by the exhaust from such engine or supplemental gas-generating devices.

A further object of this invention is to provide a supercharger which is adapted to fit onto any of the conventional internal combustion engines used on automobiles and trucks and to be powered at high speeds by intriguingly novel supplemental gas-generating means.

Another object of this invention is to provide a supercharger for internal combustion engines which is powered by the exhaust of the internal combustion engines and which is, therefore, extremely inexpensive to install and operate.

A further object of this invention is the provision in a combustion engine supercharger powered by supplemental gas-generating means having a novel escape means to avoid over pressurization of the means in the starting operation.

Still another object of this invention is to provide a supercharger for internal combustion engines of extremely durable and steady nature and is adapted to be powered by gas generating means.

This invention embodies other novelties, details of construction and arrangement of parts which are hereinafter set forth in the specification and claims, and illustrated in the accompanying drawings wherein:

Fig. 3 is an enlarged top plan view of the supercharger housing;

Fig. 4 is a sectional view taken on lines 4—4 of Fig. 3;

Fig. 5 is a sectional view taken on lines 5—5 of Fig. 3;

Figure 1:
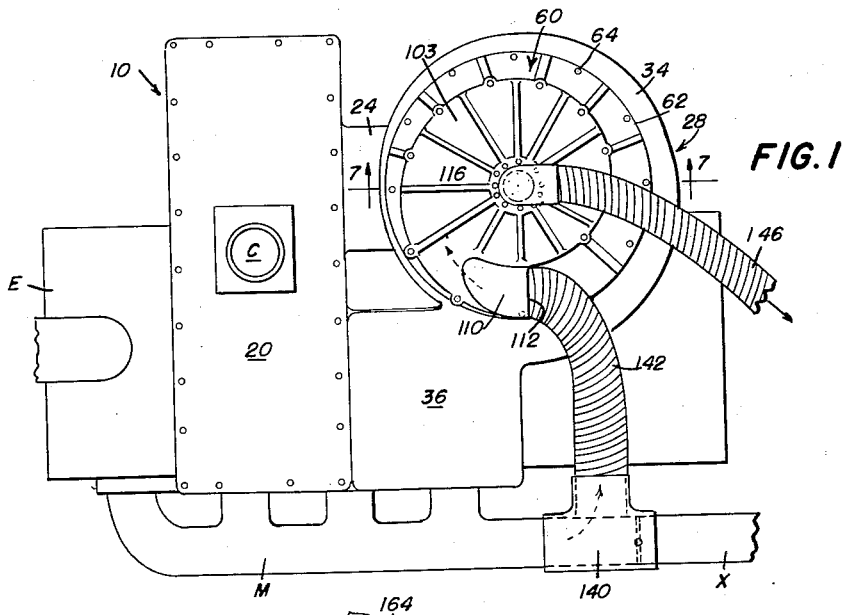
Fig. 1 is a top plan view of the supercharger using the exhaust manifold pressure to drive the impeller.

Briefly, the invention is a supercharger for an internal combustion engine comprising a flat housing including a rectangular inlet compartment to which a carburetor is adapted to be attached, an outlet compartment adapted to be connected to the intake manifold of the internal combustion engine, and an impeller housing connected between the two compartments. The impeller housing contains an impeller and has secured thereagainst means for driving the impeller including a turbine. The turbine is connected to the exhaust of the internal combustion engine, or, alternatively is connected to pulse-jet devices.

The supercharger housing

More specifically, referring to the drawings, Fig. 3 shows the supercharger housing, generally designated 10. It is a flat compartmented housing and comprises a shallow inlet compartment 12 defined by a bottom wall 14 and side walls 16 extending upwardly from the sides of said bottom wall 14. About the top of the sidewalls 16 is disposed flange 18 extending inwardly of the compartment for a short distance. The flange 18 is preferably drilled and tapped at regular intervals so that an inlet compartment cover plate 20 (see Fig. 1) can be secured thereto by means of suitable bolts extending down into the tapped drill holes. The rear sidewalls 16' of the inlet compartment as shown in Fig. 3 is formed with an aperture 22 therein. Secured to the outside surface of the sidewall 16' about the aperture 22 is a duct 24 which extends perpendicularly therefrom and is closed except for an aperture 26 in the top near the end thereof. Disposed concentrically above the aperture 26 and supported by the duct 24 is the slightly involute but substantially circular impeller housing 28. Housing 28, as shown in Fig. 4, is provided with a floor 30 sloping down toward the hole 26. To permit such sloping the duct 24 is slightly deformed in its upper sidewall. Thus, the impeller housing 28 has a substantially inverted bell-shaped configuration. From the side of the sloping floor 30 sidewalls 32 extend upwardly a short distance and then extend inwardly to form an inwardly directed peripheral flange 34. The flange is drilled and tapped at regularly spaced intervals therearound to provide attachment means for an impeller-supporting and drive means. As shown in phantom in Fig. 4, the impeller 35 is operably positioned substantially concentric with respect to the aperture 26 in the floor 30 of the housing.

The sidewalls of the slightly involute but substantially circular impeller housing 28 are interrupted where they are most involuted as shown in Fig. 3 by an outlet compartment 36 with which the housing 28 communicates. The compartment 36 is substantially rectangular and comprises a top wall 38 having sidewalls 40 extending perpendicularly down therefrom, said top wall being integral with flange 34. As shown in Fig. 3 the forward sidewall 40' contacts and is in common with a portion of the rear sidewall 16' of the inlet compartment 12. The bottom of the sidewalls 40 except forward sidewall 40' curves in to form a flange 42. The flange 42 is drilled and tapped at regular intervals to allow the securing of an outlet compartment cover plate (not shown) by means of suitable bolts extending through the cover plate into said tapped drill holes. Adjacent the sidewall 40' the bottom wall 14 of the inlet compartment 12 is also drilled and tapped to assist in the securing of the cover plate 44.

As shown best in Fig. 3, common sidewalls 16'—40' of the inlet compartment and the outlet compartment is apertured at 46 to allow for the free passage of fluid in high capacity from the inlet compartment 12 to the outlet compartment 36 by-passing the impeller housing 28. This is provided to avoid the restriction which a large capacity fluid would meet in passing through the impeller housing 28 when the impeller is not in use. The apertures 46 are equipped as shown in Figs. 3 and 5 with a one-way valve 48 which comprises a neoprene or other resilient flap 50 disposed along the sidewall 40' in the outlet compartment and held against the sidewall by a bar 52 passing over said flap member 50 and secured at either end to the sidewall 40'. Thus, when fluid is drawn by the intake manifold suction of the internal combustion engine when the supercharger is inactive the flap valve will open to allow passage through the apertures 46. When the supercharger is operating, however, pressure in the outlet compartment 36 will be greater than in the inlet compartment 12 and the one-way valve will automatically close.

The supercharger housing 10 as described above is preferably made from a single casting of either iron, steel, or aluminum. It is designed with functional yet pleasing lines and with a minimum number of protruding projections and is strengthened by the use of fillets between the various compartments in the unit.

Fig. 1 shows my supercharger attached to an internal combustion engine E of the In-Line type. As implied above, my supercharger can be used, with, among others, the In-Line, X or H types of engine. The inlet compartment cover plate 20 is secured to the peripheral flange 18 about the inlet compartment and the cover plate is apertured to receive in secure relation the fitting of the carburetor C. Although not shown in Fig. 1, the underside of the outlet compartment 36 is covered by an outlet compartment cover plate which is apertured to receive in secure relation the inlet manifold of the engine. Also as shown in Fig. 1, drive means 60 is secured to the peripheral flange 34 about the housing 28.

Supercharger impeller driving means

Figure 6:
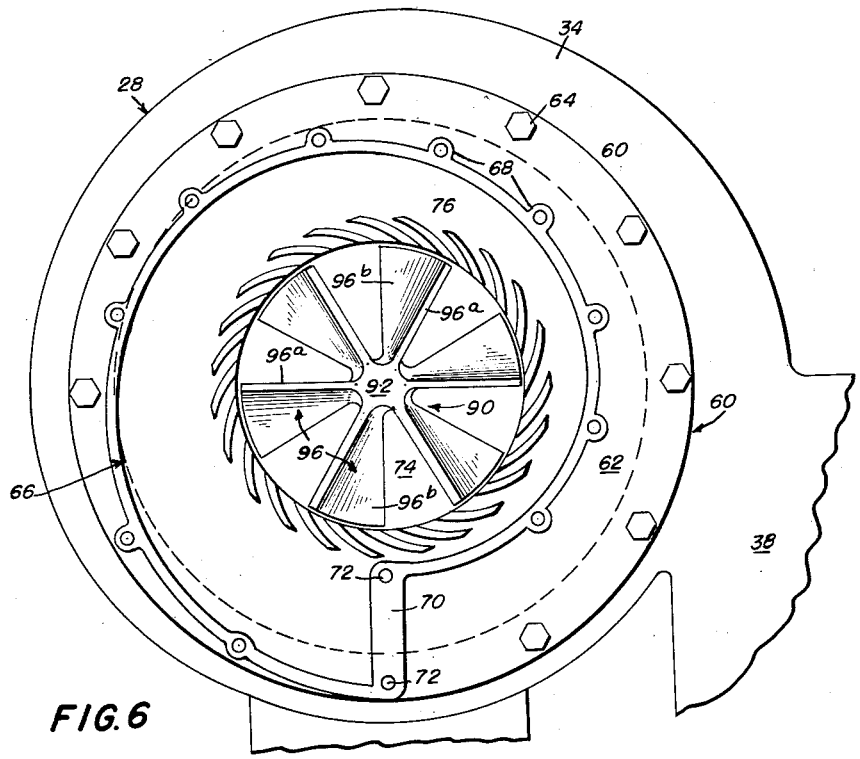
Fig. 6 is an enlarged top plan view of a portion of the supercharger with the turbine housing removed to expose the turbine rotor.

The drive means 60 shown in Fig. 1 is one of a plurality of drive means by which the supercharger may be powered. It comprises a substantially flat circular plate 62 ribbed for reinforcement and apertured about the periphery thereof to receive fastening means 64 secured to the peripheral flange 34. Spaced in from the margin of the circular plate 62 is an involute shaped housing footing 66 (see Fig. 6) slightly raised from the upper surface of the plate. Adjacent the footing 66 at suitably spaced intervals are bosses 68 drilled and tapped. The end 70 of the involute is also formed with a pair of drilled and tapped holes 72. In the center of the circular plate is a shallow well 74 (see Fig. 7). Immediately outside the periphery of this well are disposed a plurality of curved guide vanes 76. The guide vanes 76 comprise the stator of a turbine.

Disposed centrally in the shallow well 74 of the circular plate 62 is an upstanding boss 78, having axial bore 80 and reinforced by a plurality of outward radially extending downwardly sloping fins 82. The bore 80 receives a pair of opposed bushing members 84 and 86 made of bronze or the like and each having an enlarged head disposed outside of the bore shouldered against the top of the boss 78 and the bottom of the plate 60 respectively. Rotatably journaled within the bushings is a stub shaft 88. The upper end of the shaft 88 receives a turbine rotor 90 while the lower end of the shaft receives the impeller rotor 35 disposed operatively within the impeller housing 28. The turbine rotor 90 comprises a central hub 92 transversely apertured to receive a pin 94 extending through a transverse aperture of the shaft 88 to rigidly connect the two members. From the central hub 92 of the turbine rotor extend radially outward a plurality of evenly spaced blades 96. Each blade comprises a vertical wall 96a and a flat foot 96b sloping downwardly and outwardly from hub 92. The outer edge of each of the turbine rotor blades 96 is slightly spaced from the periphery of the shallow well 74 and the inner margin of the guide vanes 76 so that the rotor is free to rotate in the well. The turbine rotor blades 96 are formed on their underside with enlarged areas 96c and are curved on their upper surface to fit the wall of a housing cover 98. Areas 96c are primarily for balancing purposes: holes may be drilled in them to remove metal from a blade which is heavier than its opposite blade. The supercharger impeller 35 shown in Fig. 7 comprises a more or less conventional structure including a central hub 100 pinned through a transverse aperture in the shaft to shaft 88. From hub 100 blades 102 extend outward.

Figure 7:
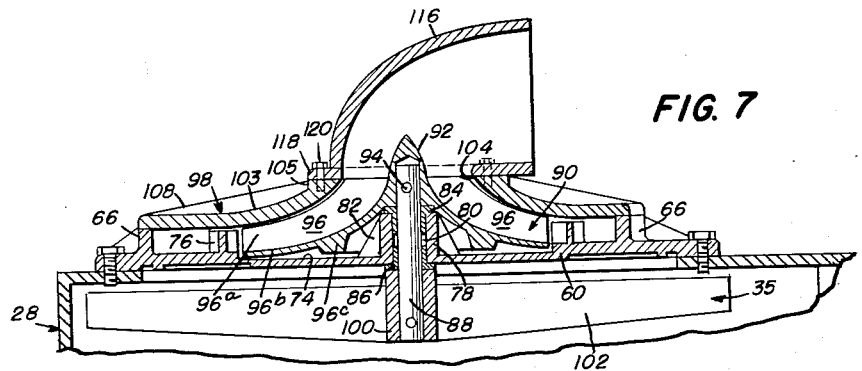
Fig. 7 is an enlarged sectional view taken on line 7—7 of Fig. 1.

Secured to the housing footing 66 is the involute shaped housing cover 98 (see Fig. 7). The cover 98 comprises an involute-shaped plate 103 having a central raised portion and opening 104 with a flange 105 therearound and a plurality of radially extending ribs 108 extending to the outer margin of the plate. About its margin the cover 98 is apertured to receive fasteners securing it to the footing bosses 68. At the end of the involute-shaped plate 103 is raised inlet fitting 110 substantially quarter-spherical in shape but contoured to flow into the involute plate 103. The inlet fitting 110 terminates in a vertically disposed face 112 which has aperture 114 threaded interiorly to receive the gas-generating source. The inlet fitting 110 is curved gradually downward to conduct gases which enter aperture 114 down into the involute housing with a minimum of resistance. Once the pressure gases are introduced down into the housing, the guide vanes 76 direct the gases against the turbine blades 94 to drive the turbine.

Figure 8:
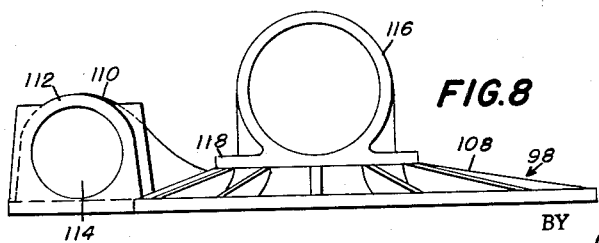
Fig. 8 is an enlarged side view of the turbine housing.

A central exhaust for the spent turbine-driving gases is provided in the aperture 104. The flange 106 about the aperture is drilled and tapped at evenly spaced intervals and an elbow fitting 116 having a circumferential flange 118 peripherally bored is secured thereto (see Figs. 7 and 8) by appropriate fastener means 120.

Figure 2:
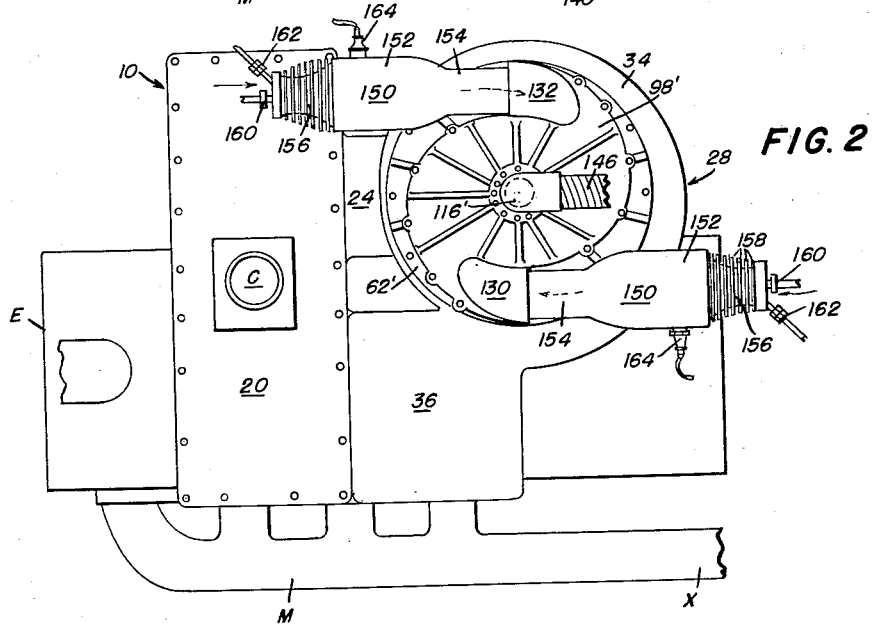
Fig. 2 is a top plan view of the supercharger using a pair of pulse-jet devices to drive the impeller.

A modified form of the turbine housing of the invention is shown in Fig. 2 wherein two inlet passages 130 and 132 for turbine-driving gases are provided. This modification comprises a circular plate 62' having a footing in the shape of the double involute consisting of two 180° involutes in diametrically opposed relation. The shape of the housing cover 98' of this modification corresponds to the footing and is suitably provided with oppositely disposed fittings 130 and 132. To these fittings are attached gas pressure sources as shown in Fig. 2, whereby more pressure gas may be directed to turn the rotor 90. The modification includes a central exhaust outlet fitting 116' for spent turbine-driving gases similar to the single involute turbine housing outlet 116.

*Turbine driving means*

Means for driving the turbine of the supercharger of this invention comprises pressure gas generating means falling broadly into one of two classes: The combustion engine with which the supercharger is used or supplemental gas-generating devices.

Fig. 1 shows the turbine driven by the first mentioned means. According to this means, the exhaust manifold M is connected at its outer end with one end of a T-shaped fitting 140 as shown in Fig. 1. The opposite end of the T-shaped fitting is connected to the exhaust line X carrying the gases through the conventional vehicle muffler, etc. The branch end of the T-shaped fitting 140 is attached to a flexible conduit 142, the opposite end of which is secured in the aperture 114 of the turbine inlet fitting 110. Disposed in the end of the T connected to the exhaust line X is a by-pass valve 144 by which line X may be cut off. When it is desired to run the engine with the supercharger functioning, the valve 144 may be closed to force exhaust gases through the turbine. The valve 144 may be controlled remotely through linkages terminating at the dashboard of the vehicle.

To the turbine exhaust fitting is secured a second flexible conduit 146 leading to the muffler of the automobile or directly to the atmosphere as desired.

In driving the supercharger of the invention by the exhaust of the combustion engine with which the supercharger is used a second arrangement is possible. Namely, when used with engines of the V type having twin exhaust manifolds the double involute housing shown in Fig. 2 may be used, an exhaust manifold conduit leading to each of the turbine inlet fittings 130 and 132. Appropriate by-pass valves and fittings as shown in Fig. 1 may be used in connection with each manifold.

Supplemental gas generating means with which the turbine 60 may be powered are shown in Fig. 2. These means 150 are commonly known as pulse jet devices and are generally well known in the art. Each comprises a tubular combustion chamber having an enlarged central portion 152 and a reduced exhaust 154. To the intake end is secured a valve head 156. The valve head 156 may be provided with a plurality of heat-radiating radially extending fins 158 to dissipate heat. Each pulse-jet device 150 is open at the end of its valve head 156 and provided with injector fittings 160 and 162 which are adapted to introduce gaseous fuel and air thereinto respectively. Disposed in the wall of enlarged portion 152 of the combustion chamber is a sparking discharge element 164 adapted to ignite the fuel during the starting process. After the first explosion, a cycle is set up: first a negative pressure drawing another charge of fuel through valve head 156, then a positive pressure closing the valve head 156 and firing the new charge with the aid of the hot gases remaining from the previous combustion. No spark is needed once the device is started.

The pulse jet exhaust portion 154 is connected as shown in Fig. 2 to the fitting 130 or 132 of the involute shaped turbine housing. Obviously, if only one pulse jet device 150 is desired to be used, a single involute housing of the type shown in Fig. 1 is used.

Figure 9:
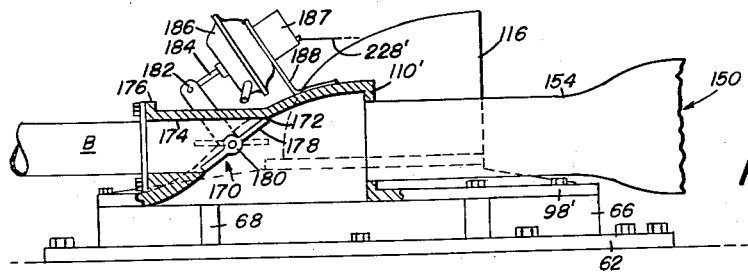
Fig. 9 is a side view partly in section of a modification of the invention showing escape valve means on the intake side of the turbine chamber.

It is well known that a pulse jet will not start properly if its exhaust opening is restricted. This presents a problem in connection with the present invention since the turbine rotor 90, not in motion at the time the pulse jet device is started, forms a restriction across the exhaust path of the pulse jet device. To meet this problem, there is provided an escape valve 170 in the turbine housing. The modification of the turbine housing incorporating this escape valve is shown in Fig. 9. In the modification the turbine inlet fitting 110' is provide in its upper surface with an opening 172 and a tubular extension 174 connected therearound. The extension 174 terminates in a flange 176 to which is connected a turbine by-pass exhaust B leading to the atmosphere. Operable in the opening is a disc-shaped damper 178. The damper 178 is provided with a shaft 180 disposed diametrically thereacross, said shaft being journaled in appropriate apertures in the opening wall. One of the ends of the shaft 180 extends through a wall and is provided with an outwardly extending arm 182 for operating the valve.

While it is desirable that the escape valve 170 be open at the time that the pulse jet device 150 is starting, it is also desirable that the escape valve 170 be open, or at least partially open, when the pulse jet device is running and the internal combination engine E is idling. This is to avoid over-pressurization in the intake manifold of the engine E.

Figure 9A:
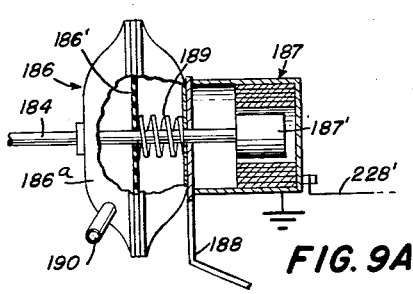
Fig. 9a is an enlarged fragmentary view partly in section showing the control means for the escape valve shown in Fig. 9.

The operating means which I use to control my valve 170 comprise a diaphragm unit 186 and a solenoid 187 mounted back-to-back on a support bracket 188 secured to fitting 110'. A shaft 184 pivotally connected to arm 182 extends upward into unit 186 and is secured to the diaphragm proper 186'. It extends on rearwardly of the unit 186 into solenoid 187 and terminates in the armature 187'. Portion 186a of the unit 186 is closed to the atmosphere and from it a tube 190 runs to the intake manifold of the engine E. A spiral spring 189 having adjusting means (not shown) is disposed about shaft 184 biasing the diaphragm in the leftward position as shown in Fig. 9a, wherein the valve 170 is closed. The electrical leads from the solenoid are connected one to ground and the other 228' to the electrical starting circuit terminal 228 as will be disclosed below.

By the above described automatic controls, for escape valve 170, as the pulse jet device 150 is started, solenoid 187 will be energized, opening the valve 170. For this purpose, the solenoid must be amply strong to overcome both the force of the spring 189 and any force which a suction present in the intake manifold may exert on damper 178. Once the pulse jet 150 is started, the solenoid 187 will be deenergized as will be explained, and the valve 170, biased by spring 189, will close. If, subsequently, pressure in the intake manifold builds up, as it would for instance when the engine idles, the diaphragm proper 186' will flex against spring 189 to open valve 170 allowing some of the supercharger driving gases to escape. Alternately, of course, arm 182 can be controlled manually by a Bowden wire or the like terminating at the dashboard of the vehicle.

The double involute turbine housing shown in Fig. 2 accommodates two pulse jet devices 150. Correspondingly, a turbine having a greater number of inlets 114 can accommodate a greater number of pulse jet devices.

Figure 10:
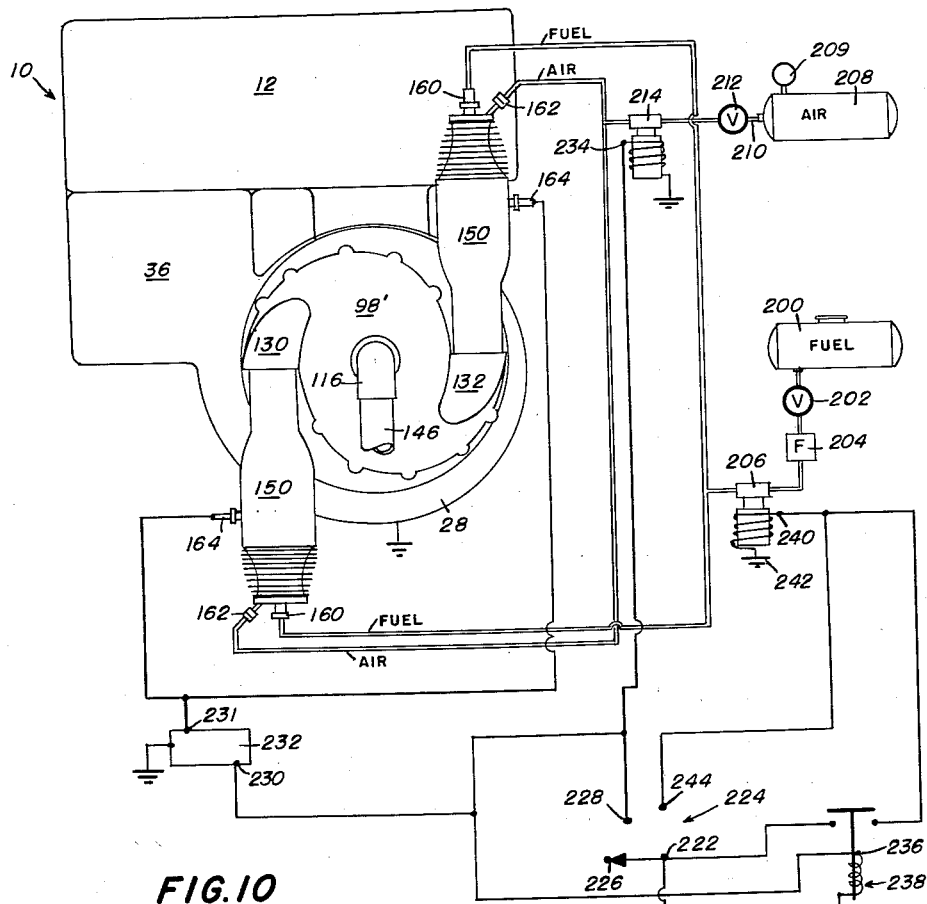
Fig. 10 is a top view similar to Fig. 2 but showing schematically the electric circuit and fluid line circuits for the pulse-jet turbine drive means.

Fig. 10 shows, partly schematically, the system by which the pulse jet devices 150, when used with the supercharger of this invention, are provided with charge. A fuel source is provided in a tank 200 from which a line through a manually operated valve 202 and a filter 204 extends through a solenoid operated valve 206. On the discharge side of the valve 206 the line branches to the fuel injectors 160 of the respective pulse jet devices. Preferably, the fuel injection devices are located centrally of the inlet opening of the pulse jet devices. For starting purposes, pressurized air is provided preferably from a pressurized tank 208 from which extends a line 210 incorporating a manually operated valve 212 to a solenoid operated valve 214. From the discharge side of the solenoid operated valve 214 the air line branches to air injector 162 in each of the pulse jet devices respectively. The air injectors 162 may be offset from the center of the pulse jet devices and may be directed slightly peripherally inside the devices to create a swirling stream.

The electric circuit of the pulse jet system may be powered by the conventional automobile storage battery 216, one terminal 218 of which is, as is conventional, grounded. The other terminal 220 of the battery is connected to the common terminal 222 of a double-throw switch 224. The switch 224 is of the make-before-break type and is preferably rotary style. It may assume three positions—one open and two alternate closed positions. In contacting point 226, the switch is open. Alternately, the switch 224 may contact the terminal 228 for starting the devices 150. The terminal 228 is connected to the terminal 230 of a T ignition coil 232 and to the terminal 234 of the air solenoid valve 214, as well as a terminal 236 of a relay 238. The opposite terminal of the solenoid 214, the relay 238, and the ignition coil 232, are grounded. Thus, when the switch contacts the terminal 228, the ignition coil 232 and relay 238 are energized, and the solenoid valve 214 for the air line is open. A high tension line runs from the ignition coil terminal 231 to the spark discharge devices 164. The relay 238 on being actuated completes a circuit from the battery 216 to terminal 240 of the fuel line solenoid valve 206. Since the opposite terminal 242 of the solenoid valve 206 is grounded, the energizing of the relay 238 actuates the solenoid valve in the fuel line to inject fuel into the pulse jet devices 150.

When the switch 224 is made to contact the terminal 244, a line running to the fuel line solenoid valve 206 only is energized, thus opening fuel solenoid valves. The ignition coil 232 and the solenoid valve 214 are not energized.

By the above arrangement, the device is off when the switch contacts the open terminal 226. When the switch contacts the terminal 228, air and fuel are supplied to the pulse jet devices 150. Also the ignition discharge devices are energized to create the desired explosion. Once the device is thus started, there is no longer a necessity for air pressure or spark. At this point, the switch is turned to the terminal 244 by which the air and ignition are cut and the fuel only is supplied. On this terminal 224 the device may be kept running as long as desired. To deenergize the device, it is merely necessary to turn the twitch to point 226 once again and the fuel supply will be cut off.

Alternate systems for charging the devices 150 may be used. For instance, it is possible to start the pulse jet devices using a high tension lead from a sparking of the engine E with which the supercharger is used. This, and a multitude of other system modifications would be obvious to a mechanic skilled in the art.

Thus, I have invented a gas driven supercharger for internal combustion engines. The device is desirable in that the gas for driving the device is either supplied by the exhaust of the internal combustion engine with which the device is used or by supplemental gas-generating means. Driven by either of the gas sources, the device is highly efficient and effective at increasing the power and speed and decreasing the gas consumption of the engine. When either gas generating means are used, the device is especially flexible in that the device may be brought into use at a moment's notice when the demand for extra power or speed arises.

While this invention has been shown in but a limited number of forms, it is obvious to those skilled in the art that it is not so limited but is susceptible of various changes and modifications without departing from the spirit and scope of the claimed invention.

I claim:

1. Drive control means for a turbo-compressor unit including a suitable turbine rotor and a supercharger impeller both mounted on a common rotor shaft extending through superimposed housings for said turbine rotor and said supercharger impeller respectively; said turbine rotor housing having on its upper exterior side a circular footing, a cover plate mounted on said footing, said plate having two inlet connections for supplying turbine driving gases, said connections opening in opposite directions and being formed on diametrically opposite sides of said cover plate tangentially above the turbine rotor housing, said cover plate having a central exhaust opening, a centrally disposed exhaust fitting mounted over said central opening, a flat compartmented housing comprising a shallow inlet compartment defined by a bottom wall, side walls extending upwardly from said bottom wall, a flange extending inwardly of said compartment a short distance thereof, a cover plate mounted on said flange, one of said side walls being a rear side wall of said compartment having an aperture, a laterally extending duct secured about said aperture, said duct having an end wall, a second aperture near the end wall of said duct, said impeller housing being mounted and disposed concentrically about said second aperture and being supported by said duct, said impeller housing having side walls and a sloping floor toward the said second aperture in the provision of a substantially inverted bell-shaped configuration and extending upwardly of the side walls of said impeller housing and inwardly to form a supporting flange for an impeller support and drive means, said impeller being mounted concentric with relation to said second aperture, said impeller housing side walls being slightly involute and substantially circular, the same being formed with an opening at the greatest involuted portion thereof, said opening communicating with an outlet compartment having top and side walls, said compartment having one side wall thereof in common with the rear side wall of said inlet compartment, a plurality of by-pass apertures in said common wall, said apertures being provided with one-way valves to permit free passage of fluid in high capacity from inlet compartment to outlet compartment thereby by-passing the impeller when not in use, pulse jet devices each having a tubular combustion chamber with an enlarged combustion portion and a reduced exhaust portion, said pulse jet devices having their respective exhaust portions each coupled in each tangential turbine inlet connection, a valve head secured in the open end of the enlarged portion of each of said enlarged combustion portions, fuel supply fittings for introducing fuel to said combustion portion, said pulse jet devices having a separate air source connected to said air supply fittings and igniter starting means in said enlarged portion of said combustion chamber.

2. Drive control means for a turbo-compressor unit including a suitable turbine rotor and a supercharger impeller both mounted on a common rotor shaft extending through superimposed housings for said turbine rotor and said supercharger impeller respectively; said turbine housing having on its upper exterior side a circular footing; a cover plate mounted on said footing, said plate having two inlet connections for supplying turbine driving gases, said connections opening in opposite directions and being formed on diametrically opposite sides of said cover plate tangentially above the turbine housing, said cover plate having a central exhaust opening, a centrally disposed exhaust fitting mounted over said central opening, pulse jet devices each having a tubular combustion chamber with an enlarged combustion portion and a reduced exhaust portion, said pulse jet devices having their respective exhaust portions each coupled in each tangential turbine inlet connection, a valve head secured in the open end of the enlarged portion of each of said enlarged combustion portions, fuel and air supply fittings for introducing fuel and air to said combustion portion, igniter starting means in said enlarged portion of said combustion chamber, said turbine housing inlet connections having a by-pass opening in a wall thereof, an escape valve in said by-pass opening, and means for opening said escape valve when said pulse jet devices are started, said escape valve opening means comprising a solenoid including an armature with an extended valve actuator shaft, a spring on said shaft normally biasing said shaft to valve closing position, said escape valve being actuated when said solenoid is energized to open position against the action of said spring as said pulse igniter starting means are energized to start said pulse devices, and whereby said spring closes said escape valve when said solenoid is deenergized.

References Cited in the file of this patent

UNITED STATES PATENTS

| | | |
|---|---|---|
| 799,561 | Hamann | Sept. 12, 1905 |
| 1,309,549 | Sherbondy | July 8, 1919 |
| 2,082,780 | Buchi | June 8, 1937 |
| 2,199,259 | Hersey | April 30, 1940 |
| 2,322,824 | Buchi | June 29, 1943 |
| 2,529,973 | Sedille et al. | Nov. 14, 1950 |
| 2,601,194 | Whittle | June 17, 1952 |
| 2,617,254 | Anderson | Nov. 11, 1952 |
| 2,628,015 | Neugebauer et al. | Feb. 10, 1953 |
| 2,643,511 | Briggs | June 30, 1953 |
| 2,672,278 | Newcomb | Mar. 16, 1954 |
| 2,684,569 | Buchi | July 27, 1954 |
| 2,715,814 | Barr | Aug. 23, 1955 |
| 2,739,440 | Seifert et al. | Mar. 27, 1956 |
| 2,795,371 | Buchi et al. | June 11, 1957 |
| 2,839,038 | Middlebrooks | June 17, 1958 |
| 2,939,649 | Shaw | June 7, 1960 |

FOREIGN PATENTS

| | | |
|---|---|---|
| 430,992 | Italy | Feb. 23, 1948 |
| 248,924 | Switzerland | Mar. 1, 1948 |